United States Patent [19]

Seelye

[11] Patent Number: 5,642,030

[45] Date of Patent: Jun. 24, 1997

[54] CHARGE CONTROL CIRCUIT

[75] Inventor: David D. Seelye, Charlevoix, Mich.

[73] Assignee: Seelye Equipment Specialists, Charlevoix, Mich.

[21] Appl. No.: 496,937

[22] Filed: Jun. 30, 1995

[51] Int. Cl.$^6$ .............................. H01M 10/46; H02J 7/00
[52] U.S. Cl. ..................... 320/9; 320/12; 320/61
[58] Field of Search .................... 320/5, 9, 12, 14, 320/15, 56, 61; 136/293

[56] References Cited

U.S. PATENT DOCUMENTS

| | | |
|---|---|---|
| 4,240,021 | 12/1980 | Kashima et al. . |
| 4,306,183 | 12/1981 | Wright . |
| 4,383,211 | 5/1983 | Staler .................................. 320/9 |
| 4,626,764 | 12/1986 | Weinhardt .......................... 320/9 |
| 4,742,291 | 5/1988 | Bobier et al. . |
| 5,153,497 | 10/1992 | Eiden ................................. 320/61 |

OTHER PUBLICATIONS

Roberts, Simon, Solar Electricity: A Practical Guide to Designing and Installing Small Photovoltaic Systems, Prentice Hall, pp. 86–93.

"Owner's Manual Model C–30," *Trace Engineering*, 15 pages.
"Owner's Manual Model C–30A," *Trace Engineering*, 17 pages.

Primary Examiner—Peter S. Wong
Assistant Examiner—Patrick B. Law
Attorney, Agent, or Firm—Price, Heneveld, Cooper, DeWitt & Litton

[57] ABSTRACT

A control circuit including a relay switch having a fixed terminal adapted to be coupled to a terminal of the battery or the charging source, a normally-closed contact terminal adapted to be coupled to a terminal of the other of one of the battery and the charging source, a normally-open contact terminal, and a relay coil. The control circuit further includes a comparator circuit for coupling to terminals of the battery to sense the voltage of the battery, and coupled to the relay coil to energize the relay coil causing a connection between the fixed terminal and the normally-open terminal of the relay switch when the voltage of the battery exceeds a first voltage threshold and to de-energize the relay coil causing a connection between the fixed terminal and the normally-closed contact terminal of the relay switch when the charging voltage of the battery falls below a second voltage threshold.

19 Claims, 4 Drawing Sheets

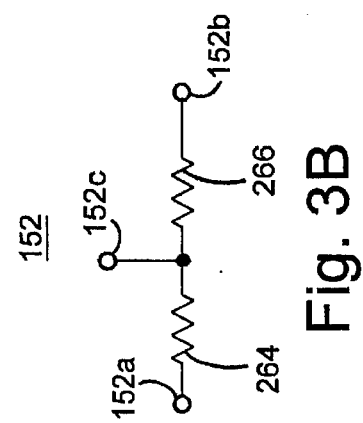
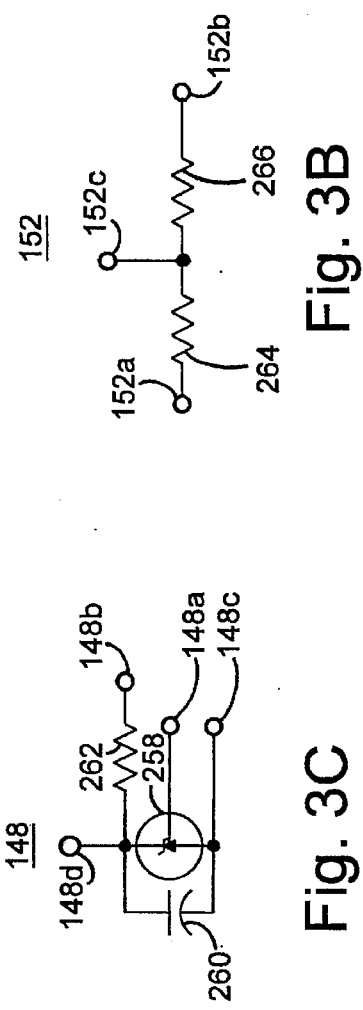
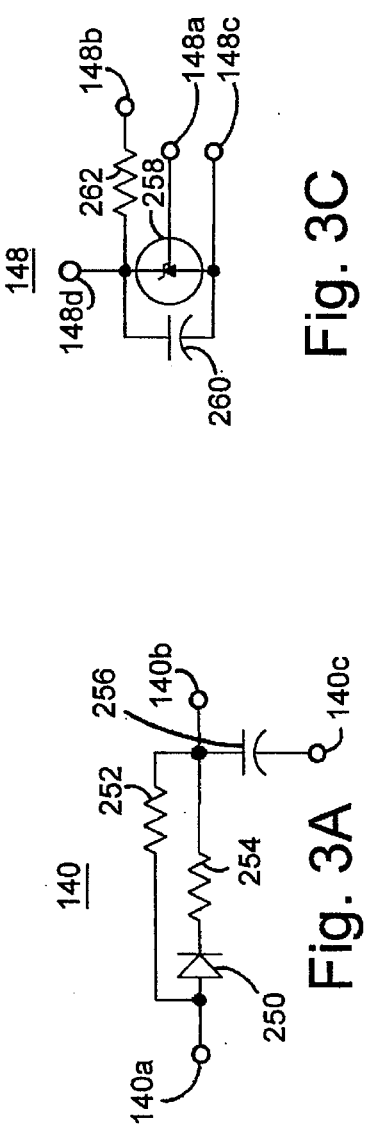
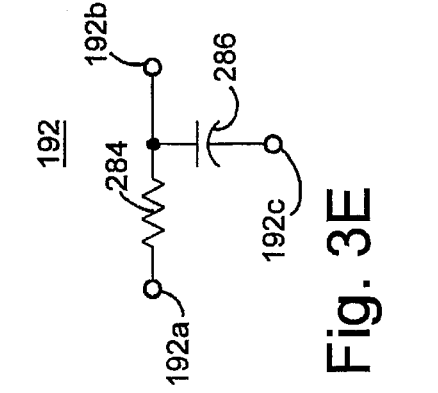
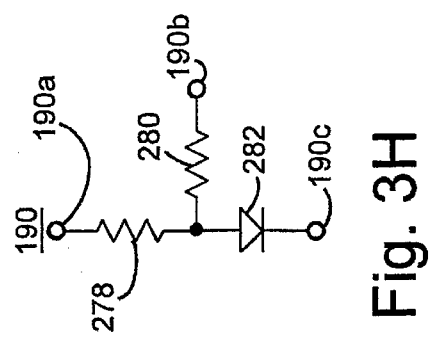
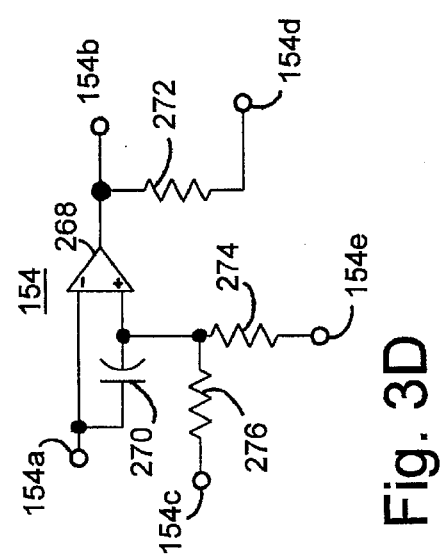

5,642,030

CHARGE CONTROL CIRCUIT

BACKGROUND OF THE INVENTION

The present invention relates to a charge control circuit, and more particularly, the present invention relates to a charge control circuit for controlling the charging of at least one battery by a charging source, such as a photovoltaic array.

In general, charge control circuits are used to selectively connect and disconnect a charging source to a battery. An example of one such charge control circuit is disclosed in U.S. Pat. No. 4,626,764, entitled "Photovoltaic Battery Charge Controller" and issued to Weinhardt on Dec. 2, 1986 (hereinafter referred to as "the '764 patent"). The charge control circuit disclosed in this patent is shown in FIG. 1 and includes a relay switch 14 having a fixed terminal coupled to a positive terminal 12 of a photovoltaic panel 11, a normally-closed contact terminal 15 coupled to an anode of a reverse current blocking diode 21, a normally-open contact terminal 16 coupled to an indicator lamp 19, and a relay coil 17 coupled to the positive terminal 12 of the photovoltaic panel 11 at one end and coupled to a first terminal of a variable resistor 18 at the other end. The variable resistor 18 has a second terminal coupled to both the negative terminal 13 of the photovoltaic panel 11 and the negative terminal 23 of the battery 24. The positive terminal 22 of the battery 24 is coupled to the cathode of the reverse current blocking diode 21.

In operation, when solar energy impinges upon the photovoltaic panel 11, the charge control circuit disclosed in the '764 patent allows the current generated by the photovoltaic panel 11 to pass from positive terminal 12 through switch 20 via the normally-closed contact terminal 15 of relay switch 14, through diode 21, and into the positive terminal 22 of battery 24. The remaining loop of the charging circuit is provided by coupling the negative terminal 23 of battery 24 to the negative terminal 13 of photovoltaic panel 11. Since coil 17 is in series with variable resistor 18, the amount of current flowing through coil 17 is regulated by the resistance imposed by variable resistor 18. In addition, the voltage drop/potential difference across coil 17 and variable resistor 18 is effectively the same as the potential difference across battery terminals 22 and 23. Therefore, if battery 24 is to be charged to a certain potential difference, variable resistor 18 can be adjusted such that a sufficient amount of current is allowed to flow through coil 17 creating the requisite amount of magnetic flux to cause switch 20 of relay switch 14 to cross from the normally-closed contact 15 to normally-open contact terminal 16, thereby opening the battery charging circuit, the third closed circuit, and preventing further charge to battery 24.

When switch 20 connects the fixed contact with the normally-open contact, a current loop passes from the positive terminal 12 of photovoltaic panel 11 through relay coil 17, variable resistor 18, and back to the negative terminal 13 of photovoltaic panel 11. The constant current through relay coil 17 causes relay switch 14 to remain in its normally-open position until no further solar energy is received by photovoltaic panel 11. Thus, when the sun sets, relay switch 14 returns to its normally-closed position making a connection between battery 24 and photovoltaic panel 11. To prevent battery 24 from subsequently discharging through photovoltaic panel 11, reverse current blocking diode 21 must be provided between the positive terminals of battery 24 and photovoltaic cell 11. Utilizing a reverse current blocking diode having a sufficient rating for blocking large amounts of current flowing from the battery is disadvantageous because such diodes consume a significant portion of the charging energy supplied to the battery during a charging cycle resulting in a loss in efficiency.

Further, the charge control circuit disclosed in the '764 patent and depicted in FIG. 1 is specifically designed for its simplicity of construction and low cost. However, this charge control circuit is extremely inefficient for several reasons. First, the charge control circuit only allows one charging cycle per day. Thus, if battery 24 is discharged during the day, the charge control circuit will not permit battery 24 to be recharged that day even though there may be an abundance of daylight left to fully recharge the battery. Second, by disconnecting a battery from a charging source when the battery voltage reaches a preset voltage level, such as the plate saturation point (i.e., the battery voltage at which the battery is bubbling), the charge control circuit disclosed in the '764 patent will only charge the battery to 20 to 50% of its capacity unless the charging current is very small compared to the battery's amp/hour capacity. Once a battery voltage levels off at the plate saturation point, the battery may be fully charged by subsequently intermittently charging the battery by connecting and disconnecting the charging source. The charge control circuit disclosed in the '764 patent would not allow for such intermittent charging to full battery capacity.

Other, more sophisticated and complex charge control circuits utilize a comparator circuit, which senses the voltage of the battery, compares the sensed voltage to a first reference voltage level, and energizes a relay coil of a relay switch coupled between the positive terminals of a photovoltaic panel and a battery when the comparator determines that the sensed battery voltage is below the first reference voltage in order to charge the battery. In this manner, the battery will be recharged whenever its voltage drops below the predefined first reference voltage level thus permitting the battery to be charged more than once per day if necessary. These comparator circuits also compare the sensed battery voltage to a second, higher reference voltage level and de-energize the relay coil to disconnect the battery from the charging source when the comparator determines that the sensed battery voltage exceeds the predefined second reference voltage level. In this manner the charge control circuit may prevent overcharging of the battery. As stated above, the comparator circuits energize the relay coil of the relay switch when in a charging state. Thus, the battery and the charging source are disconnected when the relay switch is in the normally-closed position. By energizing the relay coil during charging, the charge control circuits must divert some of the charging current through the relay coil resulting in inefficient use of the charging current during a charging state.

Although a charge control circuit utilizing the normally-closed position of a relay switch to connect a battery to a charging source is known, as disclosed in the '764 patent, the specific implementation of such a relay switch as disclosed was not recognized as providing increased efficiency particularly in view of the other noted reasons why the charge control circuit of the '764 patent is inefficient. Further, the specific implementation of the relay switch in the '764 patent was employed to allow for use of the simplified switching control mechanism, but not to increase the efficiency of the charge control circuit.

Conventional charge control circuits are often implemented with a low battery load disconnect circuit for disconnecting a load from the battery when the battery voltage falls below a preset voltage level. Such low battery load disconnect circuits do not reset (i.e., reconnect the load to the battery) until the battery has been fully charged or charged to a predetermined voltage, which is generally set just above the no load resting voltage of a charged battery (about 12.7 V for a 12 V battery). Thus, the load will remain disconnected in the morning even though the photovoltaic panels are illuminated and the battery is nearly charged. Further, on days in which the battery did not charge enough to reset the low battery load disconnect reset voltage, the load will remain disconnected at night even though the battery may be charged sufficiently to provide power to the load.

Additionally, most conventional charge control circuits utilize two predefined set points for connecting and disconnecting the battery from the charging source. However, depending upon the desired battery charging voltage, these set points should be changed to optimize the charging for the particular charging voltage.

SUMMARY OF THE INVENTION

Accordingly, the present invention has been made to overcome the above problems. One aspect of the present invention is to provide a charge control circuit that consumes very little of the charging current generated by a charging source during a charging cycle and very little current from the battery when it is not charging. Another aspect of the present invention is to provide a more efficient charge control circuit. Still another aspect of the present invention is that it is capable of charging a completely discharged (zero volt) battery.

Yet another aspect of the present invention is to optimize the set points for connecting and disconnecting the charging source from the battery for a selected charging voltage. An additional aspect of the invention is to provide a charge control circuit that allows more than one charging cycle per day.

Another aspect of the present invention is to provide a load control circuit for selectively disconnecting a load from the battery when the sensed battery voltage falls below a threshold level. Yet another aspect of the present invention is to provide a circuit in the load control circuit for reconnecting the load to the battery when the sensed charging source voltage falls below a threshold level regardless of whether the battery is fully charged.

Additional features and advantages of the invention will be set forth in part in the description which follows and in part will be apparent from the description, or may be learned by practice of the invention.

To achieve these and other advantages, and in accordance with the purpose of the invention as embodied and broadly described herein, the control circuit of the present invention includes a relay switch having a fixed terminal adapted to be coupled to a terminal of the battery or the charging source, a normally-closed contact terminal adapted to be coupled to a terminal of the other of one of the battery and the charging source, and a relay coil. The control circuit further includes a comparator circuit for coupling to terminals of the battery to sense the voltage of the battery, and coupled to the relay coil to energize the relay coil causing the fixed terminal and the normally-closed terminal of the relay switch to become disconnected when the voltage of the battery exceeds a first voltage threshold and to de-energize the relay coil causing a connection between the fixed terminal and the normally-closed contact terminal of the relay switch when the charging voltage of the battery falls below a second voltage threshold.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this Specification illustrate several embodiments of the invention and together with the description, serve to explain the objects, advantages, and principles of the invention. In the drawings:

FIG. 3A is an electrical schematic diagram of an exemplary voltage filter network for use in the control circuit shown in FIG. 2;

FIG. 3B is an electrical schematic diagram of an exemplary hysteresis network for use in the control circuit shown in FIG. 2;

FIG. 3C is an electrical schematic diagram of an exemplary adjustable precision voltage reference circuit for use in the control circuit shown in FIG. 2;

FIG. 3D is an electrical schematic diagram of an exemplary buffer/driver network for use in the control circuit shown in FIG. 2;

FIG. 3E is an electrical schematic diagram of an exemplary time delay and voltage filter network for use in the control circuit shown in FIG. 2;

FIG. 3H is an electrical schematic diagram of an exemplary voltage filter network for use in the control circuit shown in FIG. 2;

DETAILED DESCRIPTION OF PREFERRED EMBODIMENT

Figure 1:
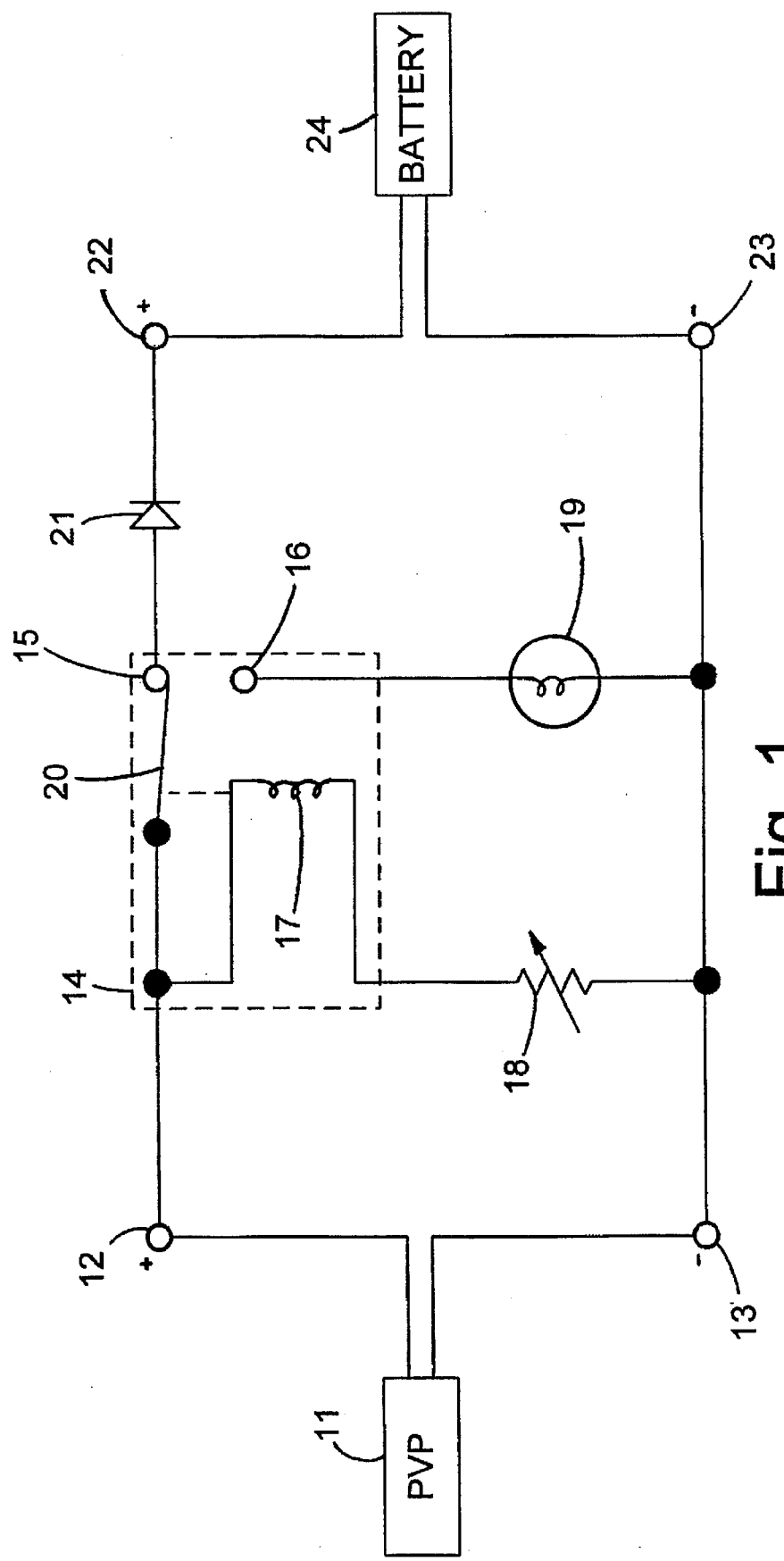
FIG. 1 is an electrical schematic diagram illustrating a conventional charge control circuit.
Figure 2:
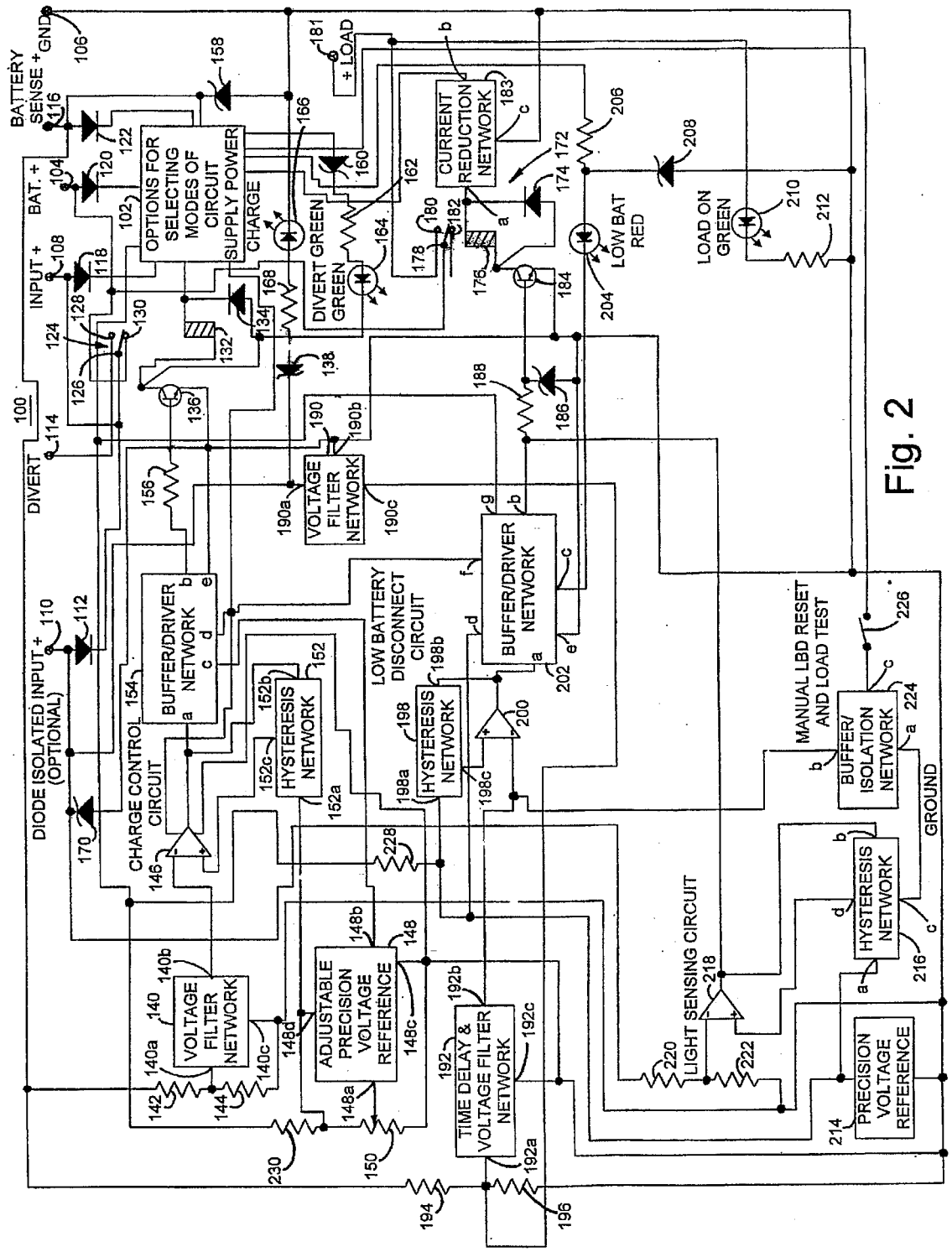
FIG. 2 is an electrical diagram in block and schematic form of a control circuit constructed in accordance with the present invention.

FIG. 2 shows a control circuit 100 constructed in accordance with the principles of the present invention. Control circuit 100 includes a battery positive terminal 104, a ground terminal 106, a positive input terminal 108 for coupling to the positive terminal of a charging source such as a photovoltaic cell, permanent magnet generator, or the like, an optional diode-isolated positive input terminal 110 for coupling to the positive terminal of the charging source so as to isolate the charging source from the circuit using a blocking diode 112. Control circuit 100 may also include a divert terminal 114 for coupling to a diverting load that may be powered by the charging source when the battery is not being charged. Such a diverting load may include a fan, pump, water heating element, or loading resistor for speed control of a wind generator. Additionally, control circuit 100 may include a battery voltage sensing terminal 116 for coupling to the battery positive terminal or to a separate battery voltage sensing wire. Control circuit 100 also preferably includes a load terminal 181 for connecting to the positive terminal of a load. By providing these connection terminals, control circuit 100 may control the coupling of a charging source to a battery through a relay switch 124, which is coupled between the positive or negative terminals of the charging source and the battery, and may control the connection of the battery to a load through a second relay switch 172.

Relay switch 124 includes a fixed terminal 126 connected to positive input terminal 108 and to the cathode of blocking diode 112, a normally-open contact 128 coupled to divert terminal 114, a normally-closed contact 130 coupled to battery positive terminal 104, a relay coil 132, and a diode 134 connected in parallel with relay coil 132. Alternatively, fixed terminal 126 could be coupled to battery positive terminal 104, normally-closed contact 130 could be coupled to positive input terminal 108, and normally-open contact 128 could be coupled to a load. Relay switch 124 is connected between the positive terminal of the battery and the positive terminal of the charging source such that the charging source is connected to the battery when relay switch 124 is in its normally-closed position (i.e., when relay coil 132 is not energized). Alternatively, relay switch 124 may be connected between the negative terminal of the battery and the negative terminal of the charging source. By utilizing the normally-closed contact 130 of relay switch 124 to make this connection, charging current from the charging source need not be diverted through relay coil 132 during a charging cycle. Thus, more of the charging current may be supplied to the battery during a charging cycle making charge control circuit 100 more efficient than the conventional charge control circuits. Further, by using the normally-closed contact of the relay switch, the control circuit of the present invention may charge a battery in a fully discharged state (zero volt) whereas the conventional charge control circuits would require a sufficient initial battery charge to energize the relay coil to connect the battery to the charging source.

Relay switch 124 is opened and closed under the control of a charge control circuit which includes a voltage filter network 140, a comparator 146, an adjustable precision voltage reference circuit 148, a hysteresis network 152, a buffer/driver network 154, and a switching transistor 136. Voltage filter network 140 includes an input terminal 140a coupled to battery voltage sensing terminal 116 through a resistor 142, an output terminal 140b coupled to the inverting input terminal of comparator 146, and a ground terminal 140c coupled to ground. Input terminal 140a is supplied with a voltage proportional to the sensed battery voltage as supplied through a voltage divider, which includes a resistor 142 and a resistor 144 coupled between input terminal 140a and ground. Voltage filter network 140 is provided to prevent erratic oscillations in the charge control circuit without severely affecting the peak battery voltage sensing capabilities of comparator 146. Preferably, voltage filter network 140 also allows fast voltage sensing of rising voltages and slow voltage sensing of a lower reconnect voltage. An example of such a voltage filter network is shown in FIG. 3A and includes a diode 250 having an anode coupled to input terminal 140a and a cathode coupled to output terminal 140b through a resistor 254. Voltage filter network 140 further includes a resistor 252 coupled between input terminal 140a and output terminal 140b in parallel with diode 250 and resistor 254, and a capacitor 256 coupled between output terminal 140b and ground terminal 140c. In this particular implementation of voltage filter network 140, diode 250 allows a rapidly rising battery voltage to quickly charge capacitor 256 and be detected by comparator 146 when resistor 254 and resistor 142 (FIG. 2) have relatively low resistance values. Resistor 252 and resistor 144 (FIG. 2), which has a relatively low resistance, set up a discharge path for capacitor 256. The resistance of resistor 252 is relatively high to allow for a delayed reconnect time in the event of a very fast battery voltage drop. Capacitor 256 also acts as a high frequency noise filter which helps prevent noise on the voltage divider network of resistors 142 and 144 from getting through to comparator 146.

Comparator 146 compares the filtered voltage output from voltage filter network 140, which corresponds to the sensed battery voltage, with reference voltages output from hysteresis network 152. If the sensed battery voltage exceeds the peak voltage set point voltage supplied by hysteresis network 152, comparator 146 outputs a voltage to a base of transistor 136 through buffer/driver network 154 and a resistor 156 coupled between the base of transistor 136 and buffer/driver network 154. The voltage output from comparator 146 causes transistor 136 to conduct thereby providing a connection to ground for relay coil 132. When relay coil 132 is connected to ground, relay coil 132 energizes and moves relay switch 124 to connect fixed terminal 126 with normally-open contact 128 thereby disconnecting the charging source from the battery. If the sensed battery voltage then falls below a reconnect voltage set point output from hysteresis network 152, comparator 146 outputs a voltage to the base of transistor 136 causing transistor 136 to enter a non-conducting state and relay switch 124 to return to its normally-closed position in which the charging source and the battery are reconnected.

Hysteresis network 152 includes an input terminal 152a coupled to receive a reference voltage established by a voltage divider including resistor 230 and potentiometer 150, a terminal 152b coupled to the output of comparator 146, and an output terminal 152c coupled to the positive input terminal of comparator 146. An example of a hysteresis network is shown in FIG. 3B and includes a resistor 264 and a resistor 266 connected in series between terminals 152a and 152b. Output terminal 152c is a tap between resistors 264 and 266. The resistances of resistors 264 and 266 establish the reference voltage for the peak voltage set point for disconnecting the charging source from the battery and the lower reconnect voltage set point for reconnecting the charging source and the battery. To allow for manual adjustment of these relative set points either one of resistors 264 and 266 may be replaced with a potentiometer.

The reference voltage applied to input terminal 152a of hysteresis network 152 represents a selected charging voltage and may be adjusted using adjustable precision voltage reference circuit 148. Adjustable precision voltage reference circuit 148 includes a terminal 148a coupled to the tap of potentiometer 150, a terminal 148b coupled to buffer/driver network 154, a ground terminal 148a coupled to ground, and a terminal 148d coupled to input terminal 152a of hysteresis network 152. An example of an adjustable precision voltage reference circuit is shown in FIG. 3C. Adjustable precision voltage reference 148 preferably includes an adjustable voltage reference device 258 coupled between terminals 148d and 148a and having an adjustment terminal connected to terminal 148a. Adjustable precision voltage reference circuit 148 also includes a capacitor 260 coupled between terminals 148d and 148c in parallel with adjustable voltage reference device 258, and a resistor 262 coupled between terminals 148b and 148d. Adjustable precision voltage reference circuit 148a allows the reference voltage that is supplied to hysteresis network 152 to be increased or decreased. By changing the reference voltage applied to resistor 264 (FIG. 3B) of hysteresis network 152, the reference voltage applied to the non-inverting input of comparator 146 is also varied. As reference voltage applied across hysteresis network 152 is changed, the hysteresis voltage applied to the non-inverting input of comparator 146 is changed linearly, but at a different rate than the voltage sensed at the inverting input. Thus, as the reference voltage supplied to input terminal 152a of hysteresis network 152 increases, the hysteresis voltage of hysteresis network 152 widens, and as the reference voltage decreases, the hysteresis voltage narrows. In this manner, the combination of adjustable precision voltage reference circuit 148 and hysteresis network 152 allow the difference in voltage between the peak and reconnect voltage set points to be increased or decreased to optimize the set points for a selected charging voltage.

Buffer/driver network 154 is provided to buffer the output from comparator 146 that is supplied to transistor 136. Buffer/driver network 154 includes an input terminal 154a coupled to the output of comparator 146, an output terminal 154b coupled to the base of transistor 136 through resistor 156, a terminal 154c coupled to terminal 148b of adjustable precision voltage reference circuit 148, a power supply terminal 154d, and a ground terminal 154e coupled to ground. An example of a buffer/driver network 154 is shown in FIG. 3D and includes a comparator 268 having an inverting input terminal connected to input terminal 154a and a non-inverting input coupled to input terminal 154a through a capacitor 270, coupled to terminal 154c through a resistor 276, and coupled to ground terminal 154e through a resistor 274. Capacitor 270 is used to improve the common mode rejection ratio of comparator 268. Resistors 276 and 274 provide a voltage divider network to divide the voltage reference supplied to terminal 154c by one-half creating a new reference voltage on the non-inverting input of comparator 268. The output of comparator 268 is coupled to output terminal 154b and to power terminal 154d through a pull-up resistor 272.

The above-described charge control circuit of the present invention connects the battery to the charging source when the battery voltage drops below a reconnect voltage set point and disconnects the charging source from the battery when the sensed battery voltage exceeds a peak voltage set point regardless of whether the charging source is supplying a charging current at the time. Thus, the charge control circuit of the present invention will allow more than one charging cycle per day.

The charge control circuit may also include a first transient suppression device 170 coupled between diode-isolated positive input terminal 110 and ground and a second transient suppression device 158 coupled between battery voltage sensing terminal 116 and ground. Additionally, a charge indicator light 166 may be provided to indicate when the batteries are being charged. The charge indicator light 166 is preferably a light emitting diode having its cathode coupled to ground and its anode coupled to diode-isolated positive input terminal 110 through a diode 138 and a resistor 168. Additionally, control circuit 100 may include a divert indicator light 164 for indicating when the charging current is diverted to a divert mode connected to divert terminal 114. Divert indicator light 164 is preferably a light emitting diode having its cathode coupled to the anode of diode 134 of relay switch 124 and having its anode coupled to a power supply via diode 160 and resistor 162.

As described above, control circuit 100 may also include a load control circuit for selectively connecting a load coupled to load terminal 181 to the battery using relay switch 172. Relay switch 172 includes a fixed terminal 178 coupled to battery positive terminal 104, a normally-open contact coupled to load terminal 181, a normally-closed contact 182, a relay coil 176, and a diode 174 coupled across the terminals of relay coil 176. When relay coil 176 is energized, relay switch 172 connects its fixed terminal 178 to the normally-open contact 180 thereby coupling the battery to the load. For situations when load circuitry current must be minimized, a transistor may be added to connect the battery to the load. The gate or base of such a transistor would be coupled between relay coil 176 and a transistor 184.

The load control circuit includes a low battery voltage disconnect circuit including a time delay and voltage filter network 192, a hysteresis network 198, a comparator 200, a buffer/driver network 202, and a precision voltage reference circuit 214. In general, a sensed battery voltage is filtered by time delay and voltage filter network 192 and supplied to the inverting input of comparator 200, which compares the sensed battery voltage to a reference voltage supplied by hysteresis network 198 to the non-inverting input of comparator 200. Comparator 200 controls a transistor 184 through buffer/driver 202 and resistor 188 causing relay coil 176 to be selectively energized.

Time delay and voltage filter network 192 includes an input terminal 192a coupled to receive a voltage proportional to the sensed battery voltage as supplied by a voltage divider including resistors 194 and 196. Resistor 194 is coupled between input terminal 192a and battery voltage sensing terminal 116, and resistor 196 is coupled between input terminal 192a and ground. Time delay and voltage filter network 192 also includes an output terminal 192b coupled to the inverting input of comparator 200, and a ground terminal 192c coupled to ground. A similar time delay circuit could be incorporated between comparator 200 and network 202 yielding longer time delays. An example of a time delay and voltage filter network is shown in FIG. 3E and includes a resistor 284 coupled between input terminal 192a and output terminal 192b and a capacitor 286 coupled between output terminal 192b and ground terminal 192c. When the sensed battery voltage applied to input terminal 192a drops momentarily below a preset low battery voltage disconnect (LBD) threshold voltage, capacitor 286 discharges through resistors 284 and 196 (FIG. 2). If the sensed voltage of the battery returns to a voltage above the preset LBD threshold voltage before the voltage across capacitor 286 drops below the voltage appearing at the non-inverting input of comparator 200, the low battery voltage disconnect circuit will not be engaged and the load will remain connected to the battery. If the sensed voltage drops below the preset LBD threshold voltage more than momentarily, comparator 200 will de-energize relay coil 176 causing the load to become disconnected from the battery. Either one of resistors 194 or 196 may be replaced by a potentiometer such that the low battery disconnect voltage is adjustable.

Figure 3G:
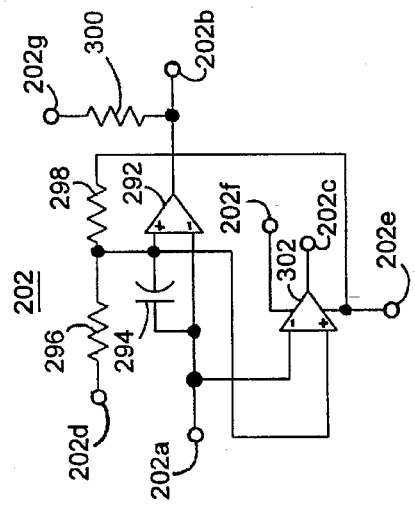
FIG. 3G is an electrical schematic diagram of an exemplary buffer/driver network for use in the control circuit shown in FIG. 2.
Figure 3I:
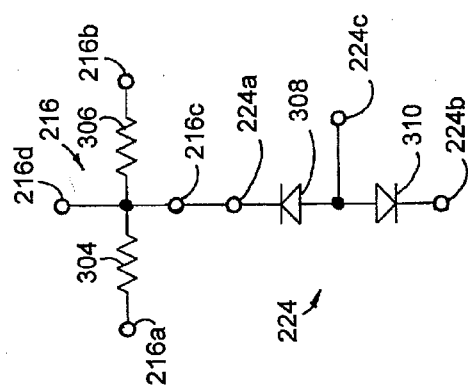
FIG. 3I is an electrical schematic diagram of an exemplary hysteresis network and buffer/isolation network for use in the control circuit shown in FIG. 2.
Figure 3F:
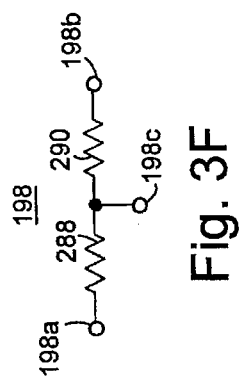
FIG. 3F is an electrical schematic diagram of an exemplary hysteresis network for use in the control circuit shown in FIG. 2.

Hysteresis network 198 is provided to establish the low battery voltage disconnect/reconnect voltage set points that are supplied from an output terminal 198c that is coupled to the non-inverting input of comparator 200. Hysteresis network 198 includes a terminal 198b coupled to the output of comparator 200 and an input reference voltage terminal 198a coupled to an output of precision voltage reference circuit 214. An example of a hysteresis network is illustrated in FIG. 3F and includes resistors 288 and 290 connected in series between input terminal 198a and terminal 198b and having a tap therebetween connected to terminal 198c. The low battery voltage connect and disconnect set points are established by resistors 288 and 290 and by the output by precision voltage reference circuit 214. Either one of resistors 288 or 290 may be replaced by a potentiometer to make the low battery disconnect hysteresis voltage adjustable. When the low battery load disconnect voltage is reset, hysteresis network 198 outputs the LBD threshold voltage to comparator 200. If the sensed battery voltage is above the LBD threshold voltage, comparator 200 energize relay coil 176 causing the battery to connect to the load. If the sensed battery voltage drops below the LBD threshold voltage output from hysteresis network 198, comparator 200 de-energizes relay coil 176 causing the battery to disconnect from the load. Once the load is disconnected, hysteresis network 198 detects the change in the voltage output from comparator 200 and supplies a higher, reconnect threshold voltage to the input of comparator 200 such that the comparator will not reconnect the battery to the load until the battery voltage reaches a level corresponding to a fully charged battery state or is charged to a predetermined voltage (i.e., 12.7 V for a 12 V battery). Once the battery voltage reaches this reconnect threshold voltage, comparator 200 reconnects the load to the battery and the low battery load disconnect voltage is reset whereby hysteresis network 198 again outputs the lower, LBD threshold voltage.

Buffer/driver network 202 is provided between the output of comparator 200 and the base of transistor 184 to buffer the output of comparator 200. Buffer/driver network 202 includes an input terminal 202a coupled to the output of comparator 200, an output terminal 202b coupled to the base of transistor 184 through resistor 188, an output terminal 202c coupled to a low battery indicator light 204, a reference voltage input terminal 202d coupled to the reference voltage output of precision voltage reference circuit 214, a ground terminal 202e coupled to ground, and a power input terminal 202f coupled to the power input terminal 154d of buffer/driver network 154 and coupled to a positive power input terminal of comparator 146. An example of a buffer/driver network 202 is shown in FIG. 3G and includes a comparator 292 having an inverting input coupled to input terminal 202a and its non-inverting input coupled to input reference voltage terminal 202d through a voltage divider including a resistor 296 and a resistor 298. Comparator 292 has its output coupled to output terminal 202b and coupled to a terminal 202g through a pull-up resistor 300. Buffer/driver network 202 further includes a capacitor 294 coupled between the inverting and non-inverting input of comparator 292 to improve the common mode rejection ratio of comparator 292. Additionally, buffer/driver network 202 includes a second comparator 302 having its inverting input coupled to input terminal 202a and having its non-inverting input terminal coupled to the non-inverting terminal of comparator 292. The output of comparator 302 is provided to output terminal 202c such that comparator 302 buffers the output of comparator 200 prior to supplying this output to low battery indicator light 204.

Low battery indicator light 204 preferably is a light emitting diode having its cathode coupled to output terminal 202c of buffer/driver network 202 and having its anode coupled to ground via a diode 208 and coupled to a power supply through a resistor 206.

The load control circuit may also include a load-ON indicator light 210 for indicating when the connected load is ON. Preferably, load-ON indicator light 210 is a light emitting diode having its anode coupled to load terminal 181 and its cathode connected to ground via a resistor 212.

The load control circuit of the present invention may be used in a "dusk to dawn" implementation in which the load may only be connected to the battery at nighttime between dusk and dawn. The dusk to dawn implementation is particularly adapted for solar-powered lighting systems. When the load control circuit of the present invention is used in a dusk to dawn implementation, the load control circuit includes a light sensing circuit and also preferably includes a reset circuit that connects the load to the batteries at dusk. The light sensing circuit determines that it is dusk based upon whether the charging voltage supplied by a photovoltaic charging source is below a predetermined threshold. Alternatively, a separate photo resistor could be provided. Thus, for example, if the charging source were a photovoltaic cell, the reset circuit would reset the low battery voltage disconnect voltage at dawn even when the sensed battery voltage is below the reconnect threshold voltage (i.e., when the battery has not been fully charged). Therefore, if the battery did not charge sufficiently by the end of a day to connect a load, the control circuit of the present invention reconnects the load to the battery at dusk when light is no longer sensed by the light sensing circuit and the battery voltage has not fallen below the LBD threshold voltage. The light sensing circuit also serves to disconnect the load from the battery in the morning when light is detected.

In general, in the dusk to dawn implementation, the upper load reconnect voltage is not utilized. Instead, the load is connected so long as it is dark (i.e., the charging source voltage is below a threshold level) and the battery voltage is above the low battery load disconnect reset voltage. The combined light sensing and reset circuit of the present invention includes a voltage filter network 190, a hysteresis network 216, a comparator 218, a buffer/isolation network 224, and a manual low battery disconnect reset and load test switch 226.

Comparator 218 has an inverting input coupled to diode-isolated positive input terminal 110 through a resistor 220 and coupled to ground through a resistor 222, and has a non-inverting input coupled to the output of hysteresis network 216. The output of comparator 218 is coupled to the base of transistor 184 through resistor 188 to selectively control relay switch 172 to connect and disconnect the battery from the load. Thus, comparator 218 compares the output voltage of the charging source as received through a voltage divider consisting of resistors 220 and 222, with a reference voltage supplied by hysteresis network 216, and connects the load to the battery when the sensed charging voltage exceeds the reference voltage.

Voltage filter network 190 is provided to buffer the input voltage from the charging source and feed it into comparator 218 through resistors 220 and 222. Voltage filter network 190 includes a terminal 190a coupled to diode-isolated positive input terminal 110 and to the inverting terminal of comparator 218 through resistor 220, a ground terminal 190b coupled to ground, and a terminal 190c coupled to terminal 192a of time delay and voltage filter network 192. An example of a voltage filter network 190 is shown in FIG. 3H and includes a resistor 278 coupled in series with a resistor 280 between terminal 190a and ground terminal 190b, and a diode 282 having a cathode coupled to terminal 190c and an anode coupled between resistors 278 and 280. Resistors 278 and 280 provide a voltage divider network to reduce the high open circuit voltage of the charging source. Diode 282 prevents the current from flowing out of the voltage divider consisting of resistors 194 and 196 (FIG. 2) back to the charging source, which would cause an error voltage in this voltage divider. Voltage filter network could also be provided with a timer for inhibiting the resetting of the low battery load disconnect voltage until a predetermined time period after dawn. Resetting the low battery load disconnect voltage at dawn permits the load to be connected at dusk as long as the battery voltage exceeds the low battery disconnect voltage, rather than the higher, load reconnect voltage utilized when the load control circuit is not used in a dusk to dawn implementation.

Hysteresis network 216 is used in combination with precision voltage reference circuit 214 to establish reference voltages used by comparator 218. Hysteresis network 216 includes a reference voltage input terminal 216a coupled to the output terminal of precision voltage reference circuit 214, a terminal 216b coupled to the output of comparator 218, a terminal 216c coupled to buffer/isolation network 224, and an output terminal 216d coupled to the non-inverting input of comparator 218. Buffer/isolation network 224 and manual low battery disconnect reset and load test switch 226 are used to isolate the reset circuit and the low battery voltage disconnect circuit and to apply voltage to each of the two circuits causing the low battery voltage disconnect circuit to reset and the load to be turned on when the switch 226 is closed. Buffer/isolation network 224 includes a terminal 224a coupled to terminal 216c of hysteresis network 216, a terminal 224b coupled to the inverting input terminal of comparator 200, and a terminal 224 coupled to manual low battery disconnect reset and load test switch 226. The other terminal of the test switch is coupled to a power supply 102. FIG. 3I shows examples of a hysteresis network 216 and a buffer/isolation network 224, which include a resistor 304 coupled in series with a resistor 306 between terminals 216a and 216b, a diode 308 having its cathode coupled between resistors 304 and 306 and having an anode coupled to terminal 224c and coupled to an anode of a diode 310, which has its cathode coupled to terminal 224b. Diodes 308 and 310 form an isolation circuit between the reset circuit and the low battery voltage disconnect circuit.

Figure 3J:
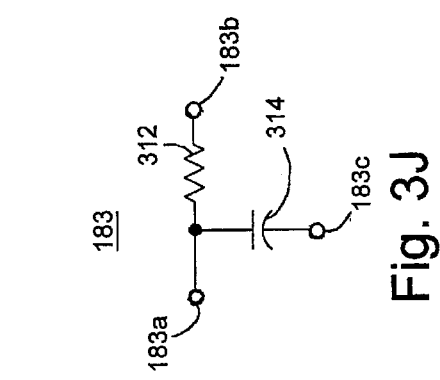
FIG. 3J is an electrical schematic diagram of an exemplary current reduction network for use in the control circuit shown in FIG. 2.

The load control circuit may also include a current reduction network 183 coupled between a power supply and relay coil 176 of relay switch 172. Current reduction network 183 is provided to reduce the power consumption by the control circuitry when the load is on. Current reduction network 183 includes an output terminal 183a coupled to the cathode of diode 174 and to relay coil 176, a power supply input terminal 183d connected to a power supply circuit 102, and a ground terminal 183c coupled to ground. An example of a current reduction network 183 is shown in FIG. 3J and includes a resistor 312 coupled between terminals 183a and 183b and a capacitor 314 coupled between terminals 183a and 183c. Resistor 312 and capacitor 314 combine to reduce the drive current supplied to relay coil 176. Capacitor 314 is charged through resistor 312 up to the battery voltage. When transistor 184 is switched on, capacitor 314 discharges through relay coil 176. When relay coil 176 is energized through transistor 184, capacitor 314 will be discharged to a voltage equal to a voltage divider value determined by the resistance of resistor 312 and relay coil 176. Preferably, the resistance of resistor 312 is set equal to that of relay coil 176.

The various components of control circuit 100 may be powered from various sources that may be selected through a particular configuration of a power supply circuit 102. Power supply circuit 102 may receive power from battery positive terminal 104 through a diode 120, battery voltage sensing terminal 116 through a diode 122, or through positive input terminal 108 through a diode 118. Diodes 118, 120, and 122 are provided for reverse polarity protection and isolation, and are not required and may be jumpered in some instances. Power supply circuit 102 supplies power to relay coil 132, comparator 146, buffer/driver network 154, buffer/driver network 202, current reduction network 183, low battery indicator light 204, manual low battery disconnect reset and load test switch 226 and to divert indicator light switch 164 from one or more of the charging source, the battery, or the battery voltage sensing wire. If a separate battery voltage sensing wire is not coupled to battery voltage sensing terminal 116, power supply circuit 102 supplies a voltage representing the battery voltage to voltage filter network 140 and time delay and voltage filter network 192. Power supply circuit 102 will reduce the high open circuit voltage from the charging source when the control circuit 100 is powered from the charging source alone or the charging source and battery together.

Although the present invention has been described as using discrete circuit components, a microprocessor may be implemented in the control circuit of the present invention to perform various tasks performed by the discrete components. For example, a microprocessor could replace the comparators.

It should be noted that, although the preferred embodiment of the present invention has been described as including a combination of a charge control circuit, a low-battery voltage load disconnect circuit, and a reset circuit, these various circuits may be implemented separately or in other combinations to provide a control circuit within the scope of the present invention. Further, the above described light sensing and reset circuit could sense the charging current output by a photovoltaic charging source to determine whether light is sensed.

The above described embodiment was chosen for purposes of describing but one application of the invention. It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A control circuit for selectively connecting and disconnecting at least one battery to a charging source, said control circuit comprising:

a relay switch having a fixed terminal, a normally-closed contact terminal, a relay coil, and a movable switching element for connecting said fixed terminal and said normally-closed contact terminal to provide a connection between the battery and the charging source when said relay coil is de-energized; and a comparator circuit for coupling to terminals of the battery to sense the voltage of the battery, and coupled between said relay coil and one of the terminals of the battery to energize said relay coil with energy supplied from one of the battery or a combination of the battery and the charging source causing said fixed terminal and said normally-closed contact terminal of said relay switch to become disconnected when the voltage of the battery exceeds a first voltage threshold and to de-energize said relay coil causing a connection between said fixed terminal and said normally-closed contact terminal of said relay switch when the voltage of the battery falls below a second voltage threshold.

2. The control circuit as defined in claim 1 and further including:
   means for selecting a reference voltage; and
   a hysteresis circuit coupled to said reference voltage selecting means and to said comparator circuit for defining said first voltage threshold and said second voltage threshold based upon the selected reference voltage.

3. The control circuit as defined in claim 1, wherein said charging source is an alternative energy charging source.

4. The control circuit as defined in claim 1, wherein said charging source is a photovoltaic panel.

5. The control circuit as defined in claim 1, wherein said charging source is a generator.

6. A control circuit for selectively connecting and disconnecting at least one battery to a charging source, said control circuit comprising:
   a relay switch having a fixed terminal, a normally-closed contact terminal, a relay coil, and a movable switching element for connecting said fixed terminal and said normally-closed contact terminal to provide a connection between the battery and the charging source when said relay coil is de-energized; and
   a comparator circuit for coupling to terminals of the battery to sense the voltage of the battery, and coupled to said relay coil to energize said relay coil causing said fixed terminal and said normally-closed contact terminal of said relay switch to become disconnected when the voltage of the battery exceeds a first voltage threshold and to de-energize said relay coil causing a connection between said fixed terminal and said normally-closed contact terminal of said relay switch when the voltage of the battery falls below a second voltage threshold,
   wherein said relay switch further includes a normally-open contact terminal, and said fixed terminal of said relay switch is adapted for coupling to a terminal of the charging source, said normally-closed contact terminal is adapted for coupling to a terminal of the battery, and said normally-open contact is adapted for coupling to a diverting load.

7. A control circuit for selectively connecting and disconnecting at least one battery to a charging source, said control circuit comprising:
   a relay switch having a fixed terminal, a normally-closed contact terminal, a relay coil, and a movable switching element for connecting said fixed terminal and said normally-closed contact terminal to provide a connection between the battery and the charging source when said relay coil is de-energized; and
   a comparator circuit for coupling to terminals of the battery to sense the voltage of the battery, and coupled to said relay coil to energize said relay coil causing said fixed terminal and said normally-closed contact terminal of said relay switch to become disconnected when the voltage of the battery exceeds a first voltage threshold and to de-energize said relay coil causing a connection between said fixed terminal and said normally-closed contact terminal of said relay switch when the voltage of the battery falls below a second voltage threshold,
   wherein the charging source includes at least one photovoltaic cell, and said charge control circuit further includes a low-battery voltage load-disconnect circuit including:
      a light sensing circuit for determining that light is impinging upon the photovoltaic cell when a sensed output generated by the photovoltaic cell exceeds a third voltage threshold;
      a load switch having a control terminal, said load switch selectively disconnecting the battery from a load in response to a load disconnect control signal applied to said control terminal; and
      a load controller coupled to said light sensing circuit and to said control terminal for controlling said load switch to disconnect the load from the battery when at least one of the following two conditions exist: (1) the voltage level of the battery falls below a fourth voltage threshold; or (2) said light sensing circuit determines that light is impinging upon the light sensor, and for controlling the load switch to connect the load to the battery when said light sensing circuit determines that light is not impinging upon the light sensor and the voltage level of the battery exceeds said fourth voltage threshold regardless of whether the battery is fully charged.

8. The control circuit as defined in claim 7, wherein said load controller of said low-battery voltage load-disconnect circuit includes:
   a reference voltage circuit for generating said fourth voltage threshold;
   a time delay and voltage filter circuit for sensing the voltage of the battery and for outputting a time-delayed voltage proportional to the sensed battery voltage; and
   a second comparator circuit coupled to said control terminal of said load switch, coupled to said reference voltage circuit, and coupled to said time delay and voltage filter circuit for controlling said load switch to disconnect the load from the battery when the time-delayed voltage received from the time delay and voltage filter circuit falls below said fourth voltage threshold.

9. A control circuit for selectively connecting and disconnecting at least one battery to a charging source, said control circuit comprising:
   a relay switch having a fixed terminal, a normally-closed contact terminal, a relay coil, and a movable switching element for connecting said fixed terminal and said normally-closed contact terminal to provide a connection between the battery and the charging source when said relay coil is de-energized; and
   a comparator circuit for coupling to terminals of the battery to sense the voltage of the battery, and coupled to said relay coil to energize said relay coil causing said fixed terminal and said normally-closed contact terminal of said relay switch to become disconnected when the voltage of the battery exceeds a first voltage threshold and to de-energize said relay coil causing a connection between said fixed terminal and said normally-closed contact terminal of said relay switch when the voltage of the battery falls below a second voltage threshold, wherein said comparator circuit includes:
   a reference voltage generator for generating reference voltages corresponding to said first and second voltage thresholds;
   a voltage filter circuit for sensing the voltage of the battery and for outputting a voltage signal proportional to the sensed battery voltage;
   a comparator coupled to said relay coil, said reference voltage generator, and to said voltage filter circuit for selectively energizing said relay coil when the voltage signal received from said voltage filter circuit exceeds said first voltage threshold and for de-energizing said relay coil when the voltage signal received from said voltage filter circuit falls below said second voltage threshold.

10. A control circuit for selectively connecting and disconnecting at least one battery to a charging source, said charge control circuit comprising:

a relay switch having a fixed terminal, a contact terminal, a relay coil, and a movable switching element for connecting said fixed terminal and said contact terminal to provide a connection between the battery and the charging source;

a comparator circuit for coupling to terminals of the battery to sense the voltage of the battery, and coupled to said relay coil to selectively disconnect the battery from the charging source when the voltage of the battery exceeds a first voltage threshold and to selectively connect the battery to the charging source when the charging voltage of the battery falls below a second voltage threshold; and a low-battery voltage load-disconnect circuit including:

a voltage sensing circuit adapted to be coupled to the charging source for sensing an output voltage generated by the charging source and for comparing the sensed output voltage with a third threshold voltage, a load switch having a control terminal, said load switch selectively disconnecting the battery from a load in response to a load disconnect control signal applied to said control terminal, and a load controller coupled to said voltage sensing circuit and to said control terminal for controlling said load switch to disconnect the load from the battery when the voltage level of the battery falls below a fourth voltage threshold, and for controlling the load switch to connect the load to the battery when said voltage sensing circuit determines that the sensed output voltage of the charging source is below said third voltage threshold and the voltage level of the battery is above said fourth voltage threshold regardless of whether the battery is fully charged.

11. The control circuit as defined in claim 10, wherein said contact terminal of said relay switch is the normally-closed contact terminal of said relay switch.

12. The control circuit as defined in claim 10 and further including:

means for selecting a reference voltage; and a hysteresis circuit coupled to said reference voltage selecting means and to said comparator circuit for defining said first voltage threshold and said second voltage threshold based upon the selected reference voltage.

13. The control circuit as defined in claim 10, wherein said load controller of said low-battery voltage load-disconnect circuit includes:

a reference voltage circuit for generating said fourth voltage threshold;

a time delay and voltage filter circuit for sensing the voltage of the battery and for outputting a time-delayed voltage proportional to the sensed battery voltage; and a second comparator circuit coupled to said control terminal of said load switch, coupled to said reference voltage circuit, and coupled to said time delay and voltage filter circuit for controlling said load switch to disconnect the load from the battery when the time-delayed voltage received from the time delay and voltage filter circuit falls below said fourth voltage threshold.

14. The control circuit as defined in claim 10, wherein said comparator circuit includes:

a reference voltage generator for generating reference voltages corresponding to said first and second voltage thresholds;

a voltage filter circuit for sensing the voltage of the battery and for outputting a voltage signal proportional to the sensed battery voltage;

a comparator coupled to said relay coil, said reference voltage generator, and to said voltage filter circuit for selectively energizing said relay coil when the voltage signal received from said voltage filter circuit exceeds said first voltage threshold and for de-energizing said relay coil when the voltage signal received from said voltage filter circuit falls below said second voltage threshold.

15. A control circuit for selectively connecting and disconnecting at least one battery to a charging source, said charge control circuit comprising:

a relay switch having a fixed terminal, a contact terminal, a relay coil, and a movable switching element for connecting said fixed terminal and said contact terminal to provide a connection between the battery and the charging source;

means for adjusting a reference voltage;

a hysteresis circuit coupled to said reference voltage adjusting means for defining a first voltage threshold and a second voltage threshold based upon the reference voltage; and a comparator circuit for coupling to terminals of the battery to sense the voltage of the battery, and coupled to said hysteresis circuit and to said relay coil to selectively disconnect the battery from the charging source when the voltage of the battery exceeds said first voltage threshold and to selectively connect the battery to the charging source when the voltage of the battery falls below said second voltage threshold.

16. The control circuit as defined in claim 15, wherein the charging source includes at least one photovoltaic cell, and said charge control circuit further includes a low-battery voltage load-disconnect circuit including:

a light sensing circuit adapted to be coupled to a terminal of the at least one photovoltaic cell, said light sensing circuit determines that light is impinging upon the photovoltaic cell when a sensed output voltage generated by the photovoltaic cell exceeds a third voltage threshold;

a load switch having a control terminal, said load switch selectively disconnecting the battery from a load in response to a load disconnect control signal applied to said control terminal, and a load controller coupled to said light sensing circuit and to said control terminal for controlling said load switch to disconnect the load from the battery when the voltage level of the battery falls below a fourth voltage threshold, and for controlling the load switch to connect the load to the battery when the said light sensing circuit determines that light is not impinging upon the photovoltaic cell and the voltage level of the battery is above said fourth threshold voltage regardless of whether the battery is fully charged.

17. The control circuit as defined in claim 16, wherein said load controller of said low-battery voltage load-disconnect circuit includes:

a reference voltage circuit for generating said fourth voltage threshold;

a time delay and voltage filter circuit for sensing the voltage of the battery and for outputting a time-delayed voltage proportional to the sensed battery voltage; and a second comparator circuit coupled to said control terminal of said load switch, coupled to said reference voltage circuit, and coupled to said time delay and voltage filter circuit for controlling said load switch to disconnect the load from the battery when the time-delayed voltage received from the time delay and voltage filter circuit falls below said fourth voltage threshold.

18. The control circuit as defined in claim 15, wherein said comparator circuit includes:

a reference voltage generator for generating reference voltages corresponding to said first and second voltage thresholds;

a voltage filter circuit for sensing the voltage of the battery and for outputting a voltage signal proportional to the sensed battery voltage;

a comparator coupled to said relay coil, said reference voltage generator, and to said voltage filter circuit for selectively energizing said relay coil when the voltage signal received from said voltage filter circuit exceeds said first voltage threshold and for de-energizing said relay coil when the voltage signal received from said voltage filter circuit falls below said second voltage threshold.

19. A control circuit for selectively connecting and disconnecting at least one battery to a charging source, said charge control circuit comprising:

a relay switch having a fixed terminal, a normally-closed contact terminal, a relay coil, and a movable switching element for connecting said fixed terminal and said normally-closed contact terminal to provide a connection between the battery and the charging source;

means for adjusting a reference voltage;

a hysteresis circuit coupled to said reference voltage adjusting means for defining a first voltage threshold and a second voltage threshold based upon the reference voltage; and a comparator circuit for coupling to terminals of the battery to sense the voltage of the battery, and coupled to said hysteresis circuit and to said relay coil to selectively disconnect the battery from the charging source when the voltage of the battery exceeds said first voltage threshold and to selectively connect the battery to the charging source when the voltage of the battery falls below said second voltage threshold.

* * * * *